US012643451B2

(12) United States Patent
Kaatz et al.

(10) Patent No.: US 12,643,451 B2
(45) Date of Patent: Jun. 2, 2026

(54) MOTOR VEHICLE HAVING A MOUNTING DEVICE FOR A TRAY

(71) Applicant: Ford Global Technologies, LLC, Dearborn, MI (US)

(72) Inventors: Sascha Kaatz, Langenfeld (DE); Sree Ram Gopal Reddy Thodeme, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 18/786,860

(22) Filed: Jul. 29, 2024

(65) Prior Publication Data

US 2025/0074282 A1     Mar. 6, 2025

(30) Foreign Application Priority Data

Aug. 30, 2023    (DE) ......................... 102023123280.0

(51) Int. Cl.
B60N 3/00          (2006.01)
B60R 11/00         (2006.01)

(52) U.S. Cl.
CPC ...... B60N 3/005 (2013.01); B60R 2011/0075 (2013.01)

(58) Field of Classification Search
CPC .............. B60N 3/005; B60R 2011/001; B60R 2011/0075
See application file for complete search history.

(56) References Cited

U.S. PATENT DOCUMENTS

| | | | | |
|---|---|---|---|---|
| 7,293,507 | B2 * | 11/2007 | DePue | B60N 3/002 108/44 |
| 10,981,482 | B2 * | 4/2021 | Bellamy | B60R 11/0252 |
| 12,109,927 | B2 * | 10/2024 | Martinez | A47B 1/04 |
| 12,304,375 | B2 * | 5/2025 | Jones | B60N 3/005 |
| 2005/0218681 | A1 * | 10/2005 | DePue | B60N 3/002 296/37.12 |
| 2016/0325662 | A1 | 11/2016 | Nash et al. | |
| 2019/0225131 | A1 | 7/2019 | Bellamy et al. | |
| 2024/0075863 | A1 * | 3/2024 | Fassbender | B60R 16/03 |
| 2024/0083320 | A1 * | 3/2024 | Martinez | B60N 3/001 |
| 2025/0042319 | A1 * | 2/2025 | Jones | B60N 3/005 |
| 2025/0074282 | A1 * | 3/2025 | Kaatz | B60N 3/005 |

FOREIGN PATENT DOCUMENTS

DE          102004011979 A1 * 10/2005    ............... B60R 7/04

OTHER PUBLICATIONS

Machine Translation of DE-102004011979-A1 (Year: 2005).*

* cited by examiner

*Primary Examiner* — Justin M Larson

(74) *Attorney, Agent, or Firm* — Vichit Chea; Price Heneveld LLP

(57)          ABSTRACT

A motor vehicle having a mounting device for a tray for use on a steering wheel or steering wheel rim arranged in a tray support position, wherein the tray has at least one guide element on a mounting side arranged opposite a tray surface, and wherein the mounting device has a counter-guide element corresponding to the at least one guide element.

18 Claims, 7 Drawing Sheets

MOTOR VEHICLE HAVING A MOUNTING DEVICE FOR A TRAY

CROSS-REFERENCE TO RELATED APPLICATION

This application claims foreign priority benefits under 35 U.S.C. § 119(a)-(d) to German Application No. 102023123280.0 filed Aug. 30, 2023, which is hereby incorporated by reference in its entirety.

FIELD OF THE DISCLOSURE

The present disclosure generally relates to a motor vehicle, having a mounting device for a tray designed for placement on a steering wheel or steering wheel rim arranged in its use position.

BACKGROUND OF THE DISCLOSURE

It is generally known that a steering wheel rim or an entire steering wheel of a motor vehicle can be designed to be arranged to be pivotable about a horizontal pivoting axis to tilt between an inclined steering position and a tray support position which can be slightly inclined or horizontal. In the tray support position, the steering wheel rim is arranged at a smaller angle of inclination than in the steering position. Arranging the steering wheel rim or steering wheel in the tray support position enables the steering wheel rim or steering wheel to hold a tray to form a surface for depositing objects, e.g., in order to provide a surface for food or a laptop, a tablet or the like when the vehicle is stopped and in park.

The steering wheel rim can be, for example, of annular design or can be designed with a shape that differs from that of a circular ring, i.e., it may also have different radii. For example, the steering wheel rim can have an approximately rectilinear section on its lower side, which is arranged at the bottom or at the lowest point when the steering wheel rim is in the straight ahead position. The steering wheel rim can be arranged on a steering wheel hub of the steering wheel in such a way as to be pivotable about the horizontal pivoting axis. Alternatively, the entire steering wheel can be arranged in a correspondingly pivotable manner. In the steering position, the steering wheel rim is typically arranged in a more steeply inclined manner and can be used by the user to steer the vehicle. In the tray support position, the steering wheel rim is typically slightly inclined or horizontally aligned.

When the steering wheel is in its steering position, the tray can, for example, be stored in a mounting device, e.g., in a glove compartment of the motor vehicle or in the trunk thereof. In some situations, the tray may move and may contact walls during accelerations, or may even rattle when the vehicle travels over irregularities in the roadway. It would be desirable to provide for the mounting and storage of the tray within the motor vehicle that avoids or reduces such movement.

SUMMARY OF THE DISCLOSURE

According to a first aspect of the present disclosure, a motor vehicle has a mounting device for a tray for use on a steering wheel or steering wheel rim arranged in a tray support position, wherein the tray has at least one guide element on a mounting side arranged opposite a tray surface, and wherein the mounting device has a counter-guide element corresponding to the at least one guide element.

Embodiments of the first aspect of the present disclosure can include any one or a combination of the following features:

the tray is matched to a design of the steering wheel or of the steering wheel rim and has different radii and also a lower section which extends in a straight line, wherein the at least one guide element is embodied as an annular raised guide portion, and wherein an indicator arrow is arranged on the mounting side;

the counter-guide element has a guide channel, which has a funnel-shaped opening, a channel section, which adjoins the funnel-shaped opening and runs obliquely, and a bottom section, which adjoins the channel section, runs in a straight line perpendicularly and ends at an inner end stop, wherein the guide channel is formed by inner guide walls, each having sections which run obliquely and perpendicularly, respectively;

the guide channel has a nose-like counterstop on one of the inner guide walls;

the counter-guide element has two outer guide walls with sections which run obliquely and perpendicularly;

the counter-guide element has end contact surfaces which have a curved profile;

the mounting device has positioning guide elements, wherein each positioning guide element has a curved abutment web, which is matched to an outer curvature of the tray, and a retaining web, which is oriented in a direction of the counter-guide element and is arranged perpendicularly on the abutment web;

each positioning guide element furthermore has an insertion opening surrounded by a lateral guide edge, wherein the lateral guide edge widens the insertion opening in a cone-like manner;

the mounting device has hold-down elements of flexible design, each of which has a spring tongue with a curved back, wherein, from a fastening end, the respective hold-down element is initially rectilinear and then curved in a circular segment in a direction of a free end; and the mounting device has a wall element.

According to a second aspect of the present disclosure, a vehicle accessory has a tray designed for use on a steering wheel or steering wheel rim arranged in a tray support position on a motor vehicle. The tray has at least one guide element on a mounting side arranged opposite a tray surface. A mounting device holds the tray when the tray is not in use on the steering wheel or steering wheel rim. The mounting device has a counter-guide element corresponding to the at least one guide element.

Embodiments of the second aspect of the present disclosure can include any one or a combination of the following features:

the tray is matched to a design of the steering wheel or of the steering wheel rim and has different radii and also a lower section which extends in a straight line, wherein the at least one guide element is embodied as an annular raised guide portion, and wherein an indicator arrow is arranged on the mounting side;

the counter-guide element has a guide channel, which has a funnel-shaped opening, a channel section, which adjoins the funnel-shaped opening and runs obliquely, and a bottom section, which adjoins the channel section, runs in a straight line perpendicularly and ends at an inner end stop, wherein the guide channel is formed by inner guide walls, each having sections which run obliquely and perpendicularly, respectively;

the guide channel has a nose-like counterstop on one of the inner guide walls;

the counter-guide element has two outer guide walls with sections which run obliquely and perpendicularly;

the counter-guide element has end contact surfaces which have a curved profile;

the mounting device has positioning guide elements, wherein each positioning guide element has a curved abutment web, which is matched to an outer curvature of the tray, and a retaining web, which is oriented in a direction of the counter-guide element and is arranged perpendicularly on the abutment web;

each positioning guide element furthermore has an insertion opening surrounded by a lateral guide edge, wherein the lateral guide edge widens the insertion opening in a cone-like manner;

the mounting device has hold-down elements of flexible design, each of which has a spring tongue with a curved back, wherein, from a fastening end, the respective hold-down element is initially rectilinear and then curved in a circular segment in a direction of a free end; and the mounting device has a wall element.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1A:
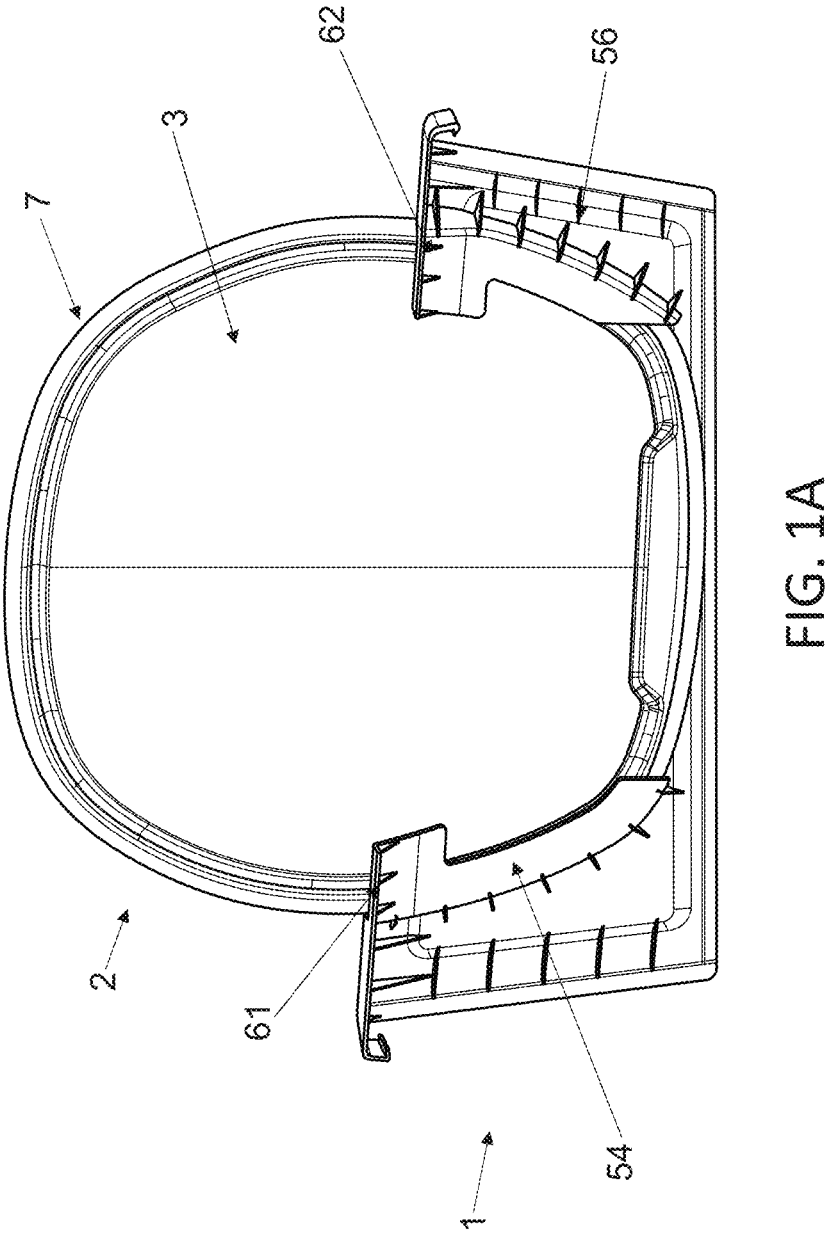
FIG. 1A is a schematic illustration of a tray mounted in a mounting device, looking toward a surface of the tray.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 7:
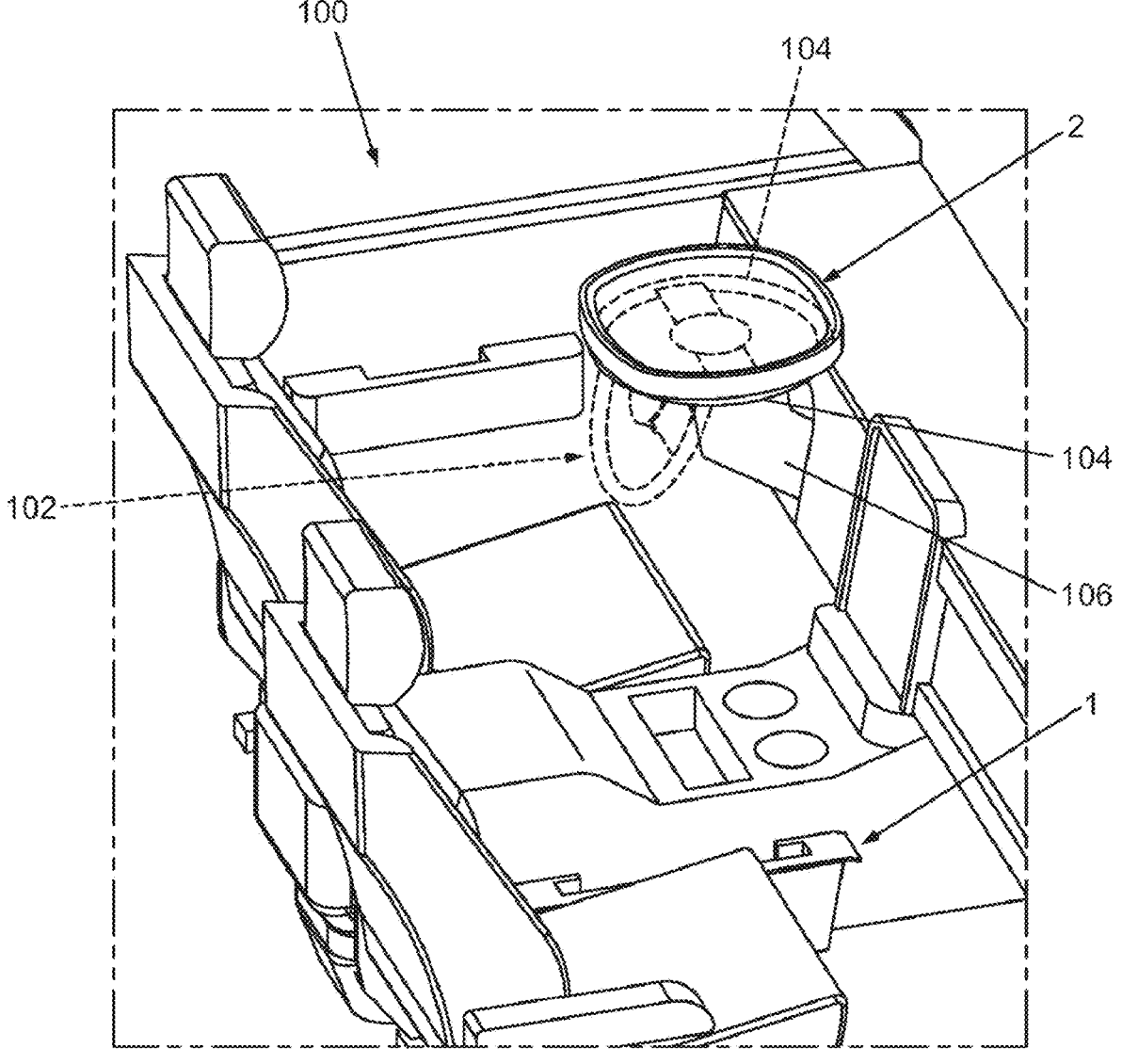
FIG. 7 is a schematic illustration of an exemplary motor vehicle having a steering wheel and the mounting device for holding the tray.

For purposes of description herein, the terms "upper," "lower," "right," "left," "rear," "front," "vertical," "horizontal," and derivatives thereof shall relate to the concepts as oriented in FIGS. 1A and 7. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a motor vehicle having a mounting device for a tray that may be useable on a steering wheel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The present application may refer to amounts and numbers. Unless expressly stated otherwise, such amounts and numbers should not be considered limiting but should be considered examples of the possible amounts or numbers in the context of the present application. In this context, the present application might also use the phrase "a plurality of" in order to refer to an amount or number. In this context, the phrase "a plurality of" should be in any number greater than one, e.g., two, three, four, five, etc. The terms "around", "approximately", "near", etc. mean plus or minus 5% of the value specified.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 7, a motor vehicle 100 is generally illustrated having a vehicle accessory according to one example. The motor vehicle 100 is shown as a wheeled motor vehicle having a steering wheel 102 with a steering wheel rim 104 and a steering wheel column 106. The steering wheel 102 may be configured in a use position arranged at an incline to enable a driver of the motor vehicle 100 to steer the motor vehicle 100 during driving operation. The steering wheel 102 may be moved to a tray support position when the vehicle is stopped and in park. In the tray support position, the steering wheel 102 may be configured to receive a tray 2 to hold one or more items such as food and drinks for eating or work objects such as a computer, a notebook and writing instruments, according to a few examples. The tray 2 may be substantially planer, may have a contoured shape and may have side walls, for example. When the tray 2 is not in use on the steering wheel 102, the tray 2 may be stored in a mounting device 1. The mounting device 1 may be located at any of a number of locations in the motor vehicle 100 such as in a footwell area of a front passenger seat, a trunk or rear storage area of the vehicle, a center console or a glovebox, for example. The tray 2 and mounting device 1 provide for a vehicle accessory for use in the motor vehicle 100.

Figure 1B:
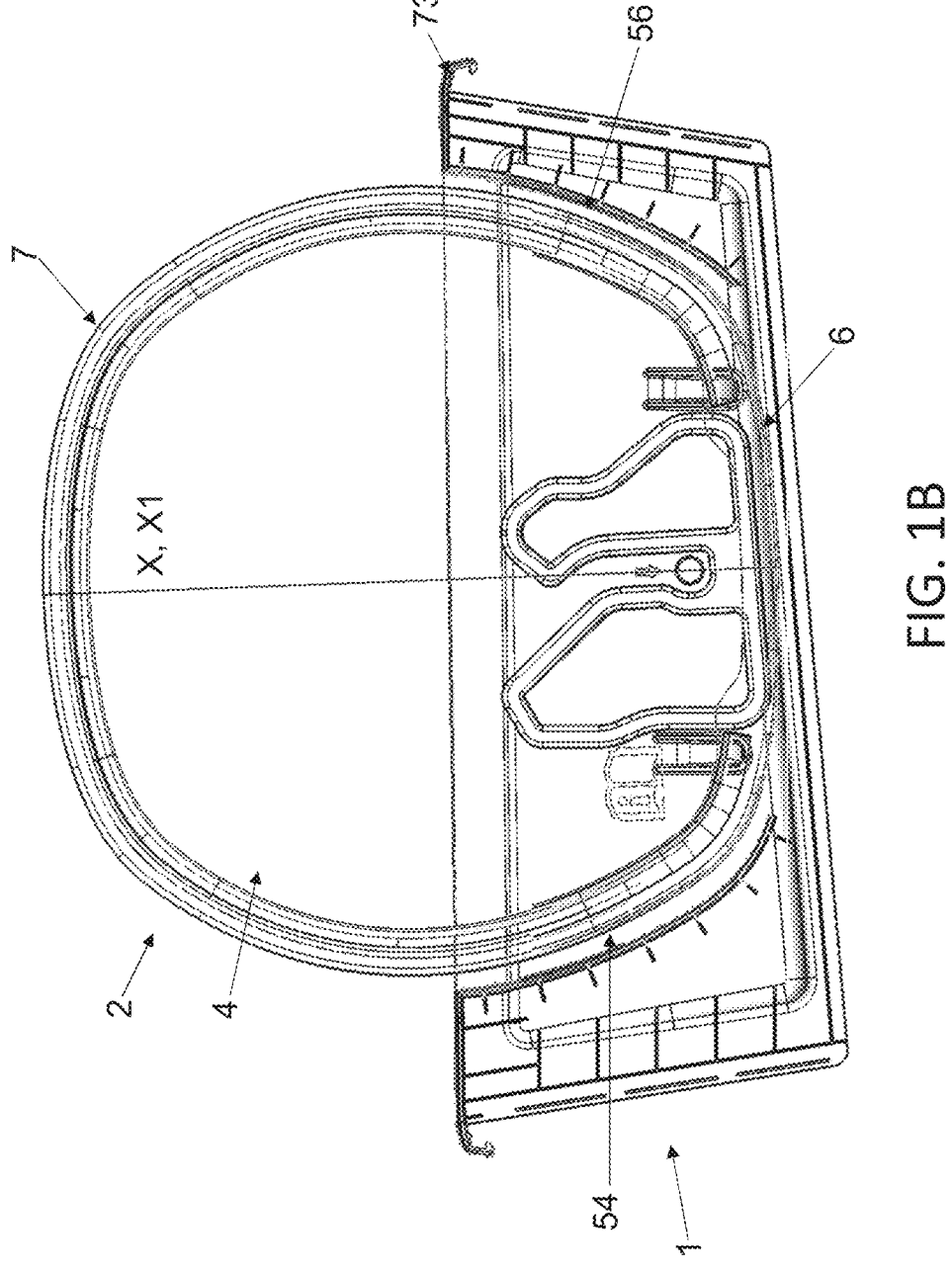
FIG. 1B is a schematic illustration of the tray shown in FIG. 1A mounted in the mounting device, looking toward the surface of the tray but in a transparent view.

FIGS. 1A and 1B show a mounting device 1 for a tray 2 for placement and use on a steering wheel or steering wheel rim of a motor vehicle 100 arranged in its tray support position. On a mounting side 4 arranged opposite a tray surface 3, the tray 2 has at least one guide element, wherein the mounting device 1 has a counter-guide element corresponding to the guide element. By virtue of the interaction between the guide element and the counter-guide element, the tray 2 is mounted in a stable position and in alignment in the mounting device 1. The view in FIG. 1A shows a view of the tray surface 3 of the tray 2. FIG. 1B likewise shows a view of the tray surface 3 but in a transparent view.

In an ideal configuration, the tray 2 is matched to the design of the steering wheel or of the steering wheel rim. In particular, the tray 2 has different radii and also a lower section 6 which extends in a straight line. In addition, the tray 2 has the tray surface 3, which faces the driver when the tray 2 is situated on the steering wheel or steering wheel rim situated in the tray support position. By means of the mounting side 4, which is opposite the tray surface 3, the tray 2 rests on the steering wheel or steering wheel rim, wherein an edge protection rubber 7 can be provided to protect the steering wheel or steering wheel rim. The at least one guide element is arranged on the mounting side 4.

Figures 2A, 2B:
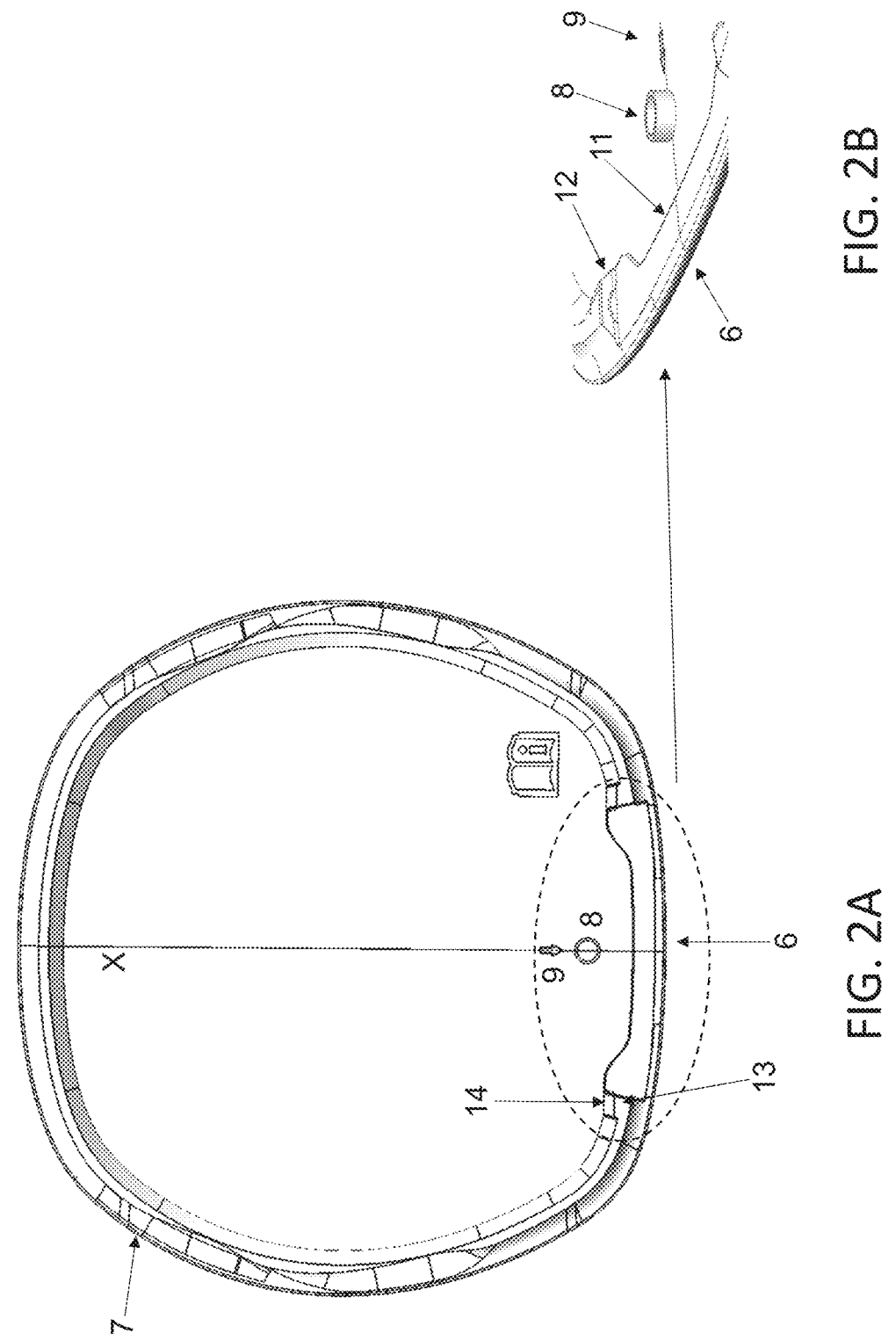
FIG. 2A is a schematic view of the tray shown in FIGS. 1A and 1B as detail in a view of the mounting side.
FIG. 2B is an enlarged view of a section showing detail of the tray from FIG. 2B.

As can be seen in FIGS. 2A and 2B, the guide element is arranged as a raised guide portion 8 in the region of the lower, rectilinear section 6 of the tray 2 and, in particular, is embodied as an annular rib-type raised portion, this being most easily ascertainable in FIG. 2B. An indicator arrow 9 is arranged above the raised guide portion 8 in the plane of the drawing of FIG. 2A. In particular, the indicator arrow 9 can specify a direction of movement, in particular a plug-in direction of the tray 2 into the mounting device 1, for which reason the indicator arrow 9 is arranged centrally above the raised guide portion 8, close to the latter, on the mounting side 4 and congruently with a center line X of the tray 2.

As can be seen in FIGS. 2A and 2B, the tray 2 has a flattened edge portion 11 (FIG. 2B) in the region of the section 6 of rectilinear design, the flattened portion having a thickened edge portion 12 on both sides (FIG. 2B), and, adjoining the latter, end pieces with thickened edge portions 13 (FIG. 2A), and, adjacent thereto, counter-surfaces 14 of the thickened edge portions (FIG. 2A). The respective end piece with the thickened edge portion 13 can be regarded as an additional guide element.

Figures 3, 4:
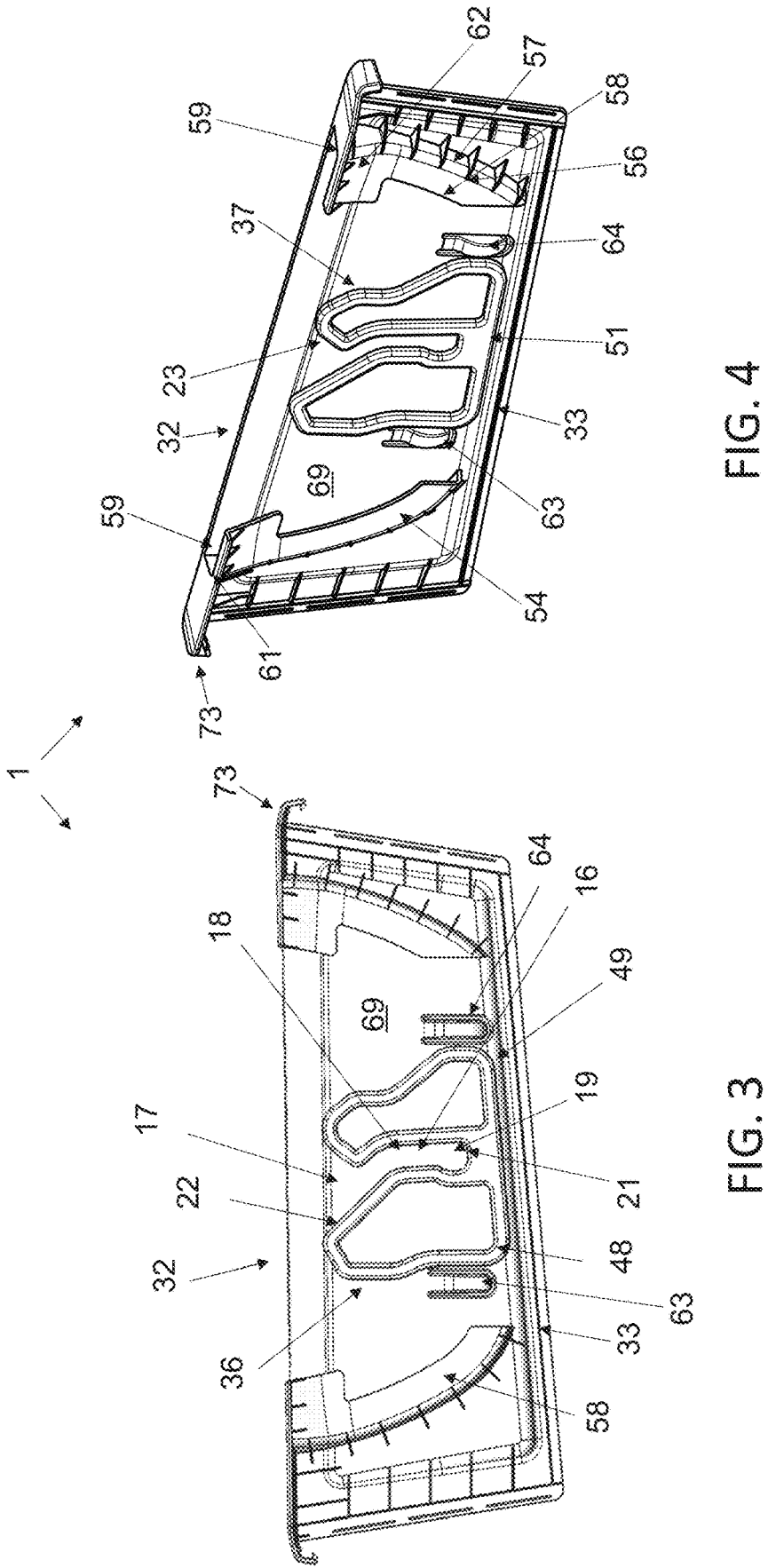
FIG. 3 is a schematic view of the mounting device from FIG. 1.
FIG. 4 is a schematic perspective view of the mounting device from FIGS. 1 and 3.
Figure 5:
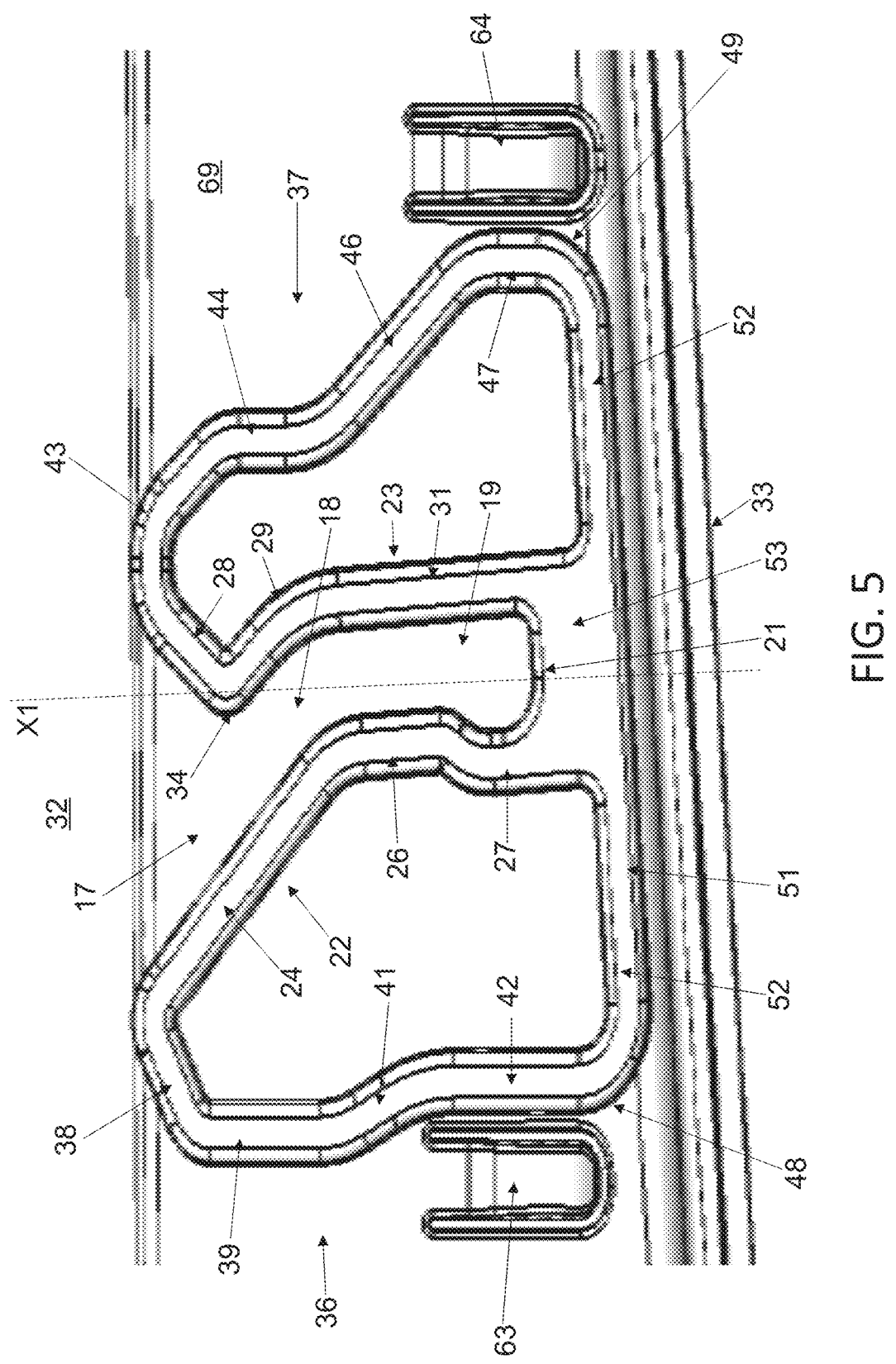
FIG. 5 is an enlarged view of the counter-guide element.

The mounting device 1 is shown as a detail in each of FIGS. 3-5. As can be seen from FIGS. 3-5, the counter-guide element has a guide channel 16, which has a funnel-shaped opening 17, a channel section 18, which adjoins said opening and runs obliquely, and a bottom section 19, which adjoins said channel section, runs in a straight line, in particular perpendicularly, and ends at an inner end stop 21, wherein the guide channel 16 is formed by inner guide walls 22, 23, each having sections 24, 26 to 29 and 31 which run obliquely and perpendicularly, respectively.

An enlarged view of the counter-guide element is shown in FIG. 5, while FIG. 4 shows most clearly the rib-type configuration thereof. In particular, the guide channel 16 has two inner guide walls 22, 23, which are arranged opposite one another and end at the inner end stop 21. When the mounting device 2 is arranged parallel to a longitudinal direction of the motor vehicle 100, it is possible to refer to a first, front, inner guide wall 22 and a second, rear, inner guide wall 23. In particular, the front inner guide wall 22 has three sections 24, 26, 27. In this arrangement, the front inner guide wall 22 extends obliquely, by use of a first section 24, from an insertion opening 32 of the mounting device 1, in the direction of a center line X1 (FIG. 5) and of a bottom 33 of the mounting device 1, and merges into an adjoining second section 26, which, while extending perpendicularly, merges into a third section 27 of arched configuration, wherein the arched shape is arched outward relative to the center line X1 of the mounting device 1. The rear inner guide wall 23 likewise has three sections 28, 29 and 31. A first section 28 of the rear inner guide wall 23 extends obliquely from the insertion opening 32 in the direction of the center line X1 and of the bottom 33 of the mounting device 1 and merges into a second section 29, which is embodied with a curvature oriented away from the center line X1. As can be seen, the counter-guide element, i.e. the guide channel 16, has a nose-like counterstop 34, wherein, in particular, a transition from the first section 28 of the rear inner guide wall 23 to the second section thereof 29 is extended beyond the center line X1 of the mounting device 1 and thus forms the nose-like counterstop 34, which can prevent unwanted movement of the tray 2 out of the mounting device 1. The second section 29 merges into an adjoining third section 31, which is designed to run perpendicularly and ends at the inner end stop 21. The first section 24 of the front inner guide wall 22 is made longer than the first section 28 of the rear inner guide wall 23. Together with the first section 28 of the rear inner guide wall 23, a first part of the first section 26 of the front inner guide wall 22 forms the funnel-shaped opening 17 of the guide channel 16. Together with the second section 29 of the rear inner guide wall 23, a second part of the first section 26 of the front inner guide wall 22 forms the obliquely extending channel section 18 of the guide channel 16. Together with the third section 31 of the rear guide channel 31, the second and the third section 26, 27 of the front inner guide wall 22 form the bottom section 19 of the guide channel 16.

As can furthermore be seen from FIGS. 3-5, the counter-guide element has two outer guide walls 36, 37 with sections 38, 39, 41 to 44, 46 and 47 which run obliquely and perpendicularly. When the mounting device 1 is arranged parallel to the longitudinal direction of the motor vehicle 100, it is possible to refer to a first, front, outer guide wall 36 and a second, rear, outer guide wall 37. In particular, the first, front, outer guide wall 36 can have four sections 38, 39, 41 and 42. A first section 38 of the first, front, outer guide wall 36 begins, in particular, at the first section 24 of the first, front, guide wall 22 and extends obliquely, in a manner oriented away from the insertion opening 32 of the mounting device 1 and the center line X1 thereof, in the direction of the bottom 33 of the mounting device 1. The first section 38 merges into an adjoining second section 39, which extends perpendicularly, parallel to the center line X1, in the direction of the bottom 33 of the mounting device 1. The second section 39 merges into an adjoining third section 41, which has an arched shape in the direction of the center line X1 and merges into a fourth section 42 which, like the second section 39 of the first, front, outer guide wall 36, has a perpendicular profile. In particular, the second, rear, outer guide wall 77 can likewise have four sections 43, 44, 46, 47. A first section 43 of the rear outer guide wall 37 begins, in particular, at the first section 28 of the rear front guide wall 23 and extends obliquely from the insertion opening 32 in a manner oriented away from the center line X1 of the mounting device 1, in the direction of the bottom 33 of the latter. The first section 43 merges into an s-shaped second section 44, which is adjoined by a third section 46 which, like the first section 43, extends obliquely from the insertion opening 32 in a manner oriented away from the center line X1 of the mounting device, in the direction of the bottom 33. The third section 46 is made longer than the first section 43 but both have the same orientation. The third section 46 is adjoined by a fourth section 47, which is aligned perpendicularly, parallel to the center line X1.

The outer guide walls 36, 37 of the counter-guide element interact with the associated end pieces of the tray 2, which have thickened edge portions 13, thus ensuring that a centered orientation is maintained when the tray 2 is inserted into the mounting device 1.

As can furthermore be seen from FIGS. 3-5, the counter-guide element has end contact surfaces 48, 49, which have a curved profile. When the mounting device 1 is arranged parallel to the longitudinal direction of the motor vehicle 100, it is possible to refer to a first, front, end contact surface 48 and a second, rear, end contact surface 49. In particular, the end contact surfaces 48, 49 form a transition between the respective outer guide walls 36, 37 and a bottom element 51 of the counter-guide element. As can be seen, the end contact surfaces 48, 49 are, in particular, of curved design. The bottom element 51 has, in particular, a bottom web 52, which extends between the two end contact surfaces 48, 49, horizontally with respect to the bottom 33 of the mounting device 1. A thickened bottom portion 53 is provided, in particular centrally on the bottom web 51, which thickened portion forms the inner end stop 21 and to which the front inner guide wall 22 and the rear inner guide wall 23 are connected, in particular by means of their respective third sections 27, 31.

As can furthermore be seen from FIGS. 3 and 4, the mounting device 1 has positioning guide elements 54, 56. Part of the circumference of the tray 2 can be accommodated in the positioning guide elements 54, 56, this being most clearly visible in FIG. 1A. When the mounting device 1 is arranged parallel to the longitudinal direction of the motor vehicle 100, it is possible to refer to a first, front, positioning guide element 54 and a second, rear, positioning guide element 56. Both are, in particular, of identical design and are arranged as a mirror image in relation to the center line X1. However, this is not intended to have a restrictive effect, with an individual configuration of the two positioning guide elements 54, 56 ideally being dependent on the contour of the steering wheel rim. In particular, each positioning guide element 54, 56 has a curved abutment web 57, which is matched to an outer curvature of the tray 2, and a retaining web 58, which is oriented in the direction of the counter-guide element and is arranged perpendicularly on the abutment web 57. Reinforcing ribs are also arranged on the abutment web 57. The positioning guide elements 54, 56 are, in particular, each open in the direction of the counter-guide element, in particular in the direction of the respective outer guide walls 36, 37, thus forming as it were an open receiving channel. In particular, each positioning guide element 54, 56 furthermore has an insertion opening 59, which is in each case surrounded by a lateral guide edge 61, 62. When the mounting device 1 is arranged parallel to the longitudinal direction of the motor vehicle 100, it is possible to refer to a first, front, lateral guide edge 61 and a second, rear, lateral guide edge 62. In particular, the lateral guide edge 61, 62 is in each case embodied in such a way that the insertion opening 59 widens in a cone-like manner, making it easier to push in or plug in the tray 2.

Figure 6:
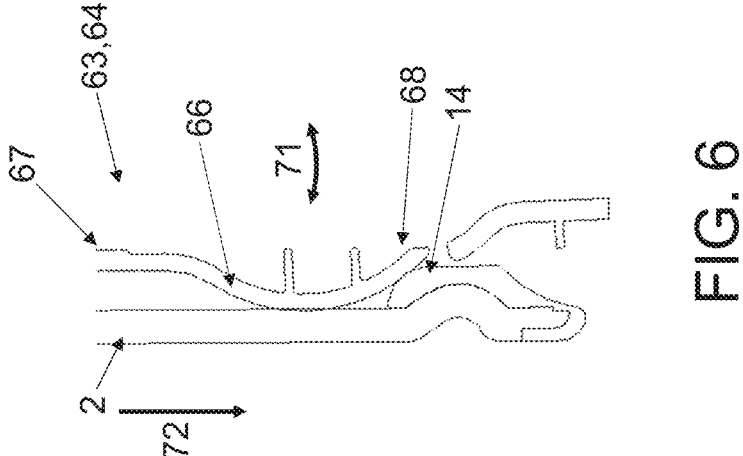
FIG. 6 is a schematic illustration of a hold-down element.

As can furthermore be seen from FIGS. 3-5, the mounting device 1 has hold-down elements 63, 64 of flexible design. When the mounting device 1 is arranged parallel to the longitudinal direction of the motor vehicle, it is possible to refer to a first, front, hold-down element 63 and a second, rear, hold-down element 64. In particular, the hold-down elements 63, 64 are arranged adjacent to the respective outer guide walls 36, 37 of the counter-guide element, at the level of the respective fourth section 42, 47 of said guide walls. In particular, the front hold-down element 63 is arranged higher than the rear hold-down element 64 in relation to the bottom 33 of the mounting device 1. The respective hold-down element 63, 64 could also be referred to as a spring element and, in FIG. 6, is illustrated as a detail in interaction with the tray 2. In particular, the respective hold-down element 63, 64 has a spring tongue 66 with a curved back. From its fastening end 67, the hold-down element 63, 64 initially extends in a rectilinear manner and is then curved in the manner of a circular segment in the direction of its free end 68. In this case, the free end 68 of the respective hold-down element 63, 64 rests against the counter-surface 14 of the thickened edge portion due to spring force when the tray 2 is mounted in the mounting device 1. The possibility for movement of the spring tongue 66 is illustrated by means of the curved arrow 71 in FIG. 6. The plug-in force of the tray 2 is illustrated by means of the arrow 72 directed downward in the plane of the drawing of FIG. 6.

As can furthermore be seen from FIGS. 3-5, the mounting device 1 has a wall element 69 on which are arranged the counter-guide element as a rib-type raised portion, the positioning guide elements 54, 56 with their lateral guide edges 61, 62, and the hold-down elements 63, 64. In particular, this enables the wall element 69 to be secured at a suitable location in the interior of the motor vehicle 100. In particular, the elements of the mounting device 1 are embodied and also matched to one another and to the elements of the tray 2 in such a way that the tray 2 can be stowed in the mounting device 1 in a stable location and without rattling, even in unexpected situations of acceleration, but can be easily removed. Overall, the counter-guide element is embodied as a rib-type raised portion, which means that the gap between the outer and inner guide walls 22, 36 and 23, 37 is kept free from material, which has a weight-reducing effect. Overall, the mounting device I can consist of a suitable material, e.g. a plastic. In an ideal configuration, the mounting device 1 is produced integrally, i.e. in a single process, e.g. by injection molding or by means of additive manufacture. On the upper side, the mounting device 1 also has laterally projecting flanges 73, which are bent in a hook shape and can be used for fastening.

The insertion or plugging in of the tray 2 into the mounting device I can be carried out as follows. First of all, the tray 2 is aligned vertically. The indicator arrow 9 is helpful during this process, the arrow defining the underside of the tray 2 and being intended to point downward in the plane of the drawing of the figures. The rectilinear section 6 of the tray 2 is thus aligned parallel to the bottom 33 of the mounting device 1. Any other alignment would not match because the thickened edge portion 12 would always collide with the counter-guide element. Only the flattened edge portion 11 can get past the counter-guide element. The lateral guide edges 61, 62 on the positioning guide elements 54, 56 prevent the tray 2 from being installed in an incorrect lateral position on account of the forcible contact of the raised guide portion 8, i.e. the rib-type circular raised guide portion, with the counter-guide element.

Only when the raised guide portion 8 is positioned above the funnel-shaped opening 17 of the guide channel 16 and the flattened edge portion 11 is aligned with the counter-guide element can the tray 2 be moved downward, i.e. in the direction of the bottom 33 of the mounting device 1, with the rib-type raised guide portion 8 sliding along the inner guide walls 22, 23. From this position, therefore, the tray 2 can be moved downward by use of the rib-type raised guide portion 8, following the guide channel 16 of the counter-guide element, while the two outer guide walls 36, 37 hold the tray 2 in the defined alignment by forming a boundary for the two end pieces with thickened edge portions 13. In particular, the outer guide walls 36, 37, with their sections 38, 39, 41, 42; 43, 44, 46, 47 of differing and mutually matched design, are ideally adapted to the function of alignment and guidance. It can furthermore be seen in the figures that the counter-guide element is closed in the direction of the insertion opening 32 by use of the respective mutually adjoining first sections 24, 38 and 28, 43 at the respective inner and outer guide wall 22, 36 and 23, 37, which can be regarded as a further measure for the avoidance of incorrect insertion.

The tray 2 is in the end position when the rib-type raised guide portion 8 is stopped in its downward movement by contact with the inner end stop 21. At the same time, end alignment is accomplished by the guidance of the two end pieces with thickened edge portions 13 by the outer guide walls 36, 37 to the end contact surfaces 48, 49. As can be seen from FIG. 1B, the rib-type raised guide portion 8 is held centered in the bottom section 19 with a clearance relative to the respective inner guide wall 22, 23, without being clamped in there. This configuration makes manual removal easier.

During the downward movement, the respective thickened edge portion 12 must overcome the spring forces of the two hold-down elements 63, 64. As described above, these two hold-down elements 63, 64 are secured flexibly on the mounting device 1, thus enabling them to yield to the thickened edge portions 12 during the plug-in movement (arrow 71 in FIG. 6) when the thickened edge portion 12 of the tray 2 is moved, i.e., plugged or pressed, through the gap between said hold-down elements 63, 64 and the inside of the outer positioning guide elements 54, 56. The free ends 68 of the hold-down elements 54, 56 produce a downward-directed force on the counter-surfaces 14 of the thickened edge portion 12 (FIG. 6). This prevents a vertical movement and improves the squeaking and rattling behavior of the tray 2 mounted in the mounting device 1.

In this way, the tray 2 is mounted in the motor vehicle 100 in a stable location and without troublesome rattling noises, wherein the tray 2 is as it were clamped in in the mounting device 1.

In the case of acceleration, the rib-type raised guide portion 8 of the tray 2 cannot move either forward or backward in its end position, despite the arched shape in the bottom section 19, and holds the tray 2 in the inserted position. Admittedly, the tray 2 could be released from the hold-down elements 63, 64 if there were unexpectedly high acceleration. However, the only possible path for the tray 2 in this case is vertically upward through the guide channel 16. During this process, it loses a large part of its kinetic energy, e.g., owing to alternating impact against the inner guide walls 22, 23, and nevertheless remains in the mounting device 1. The upward movement with significantly reduced kinetic energy is stopped when the rib-type raised guide portion 8 strikes the nose-like counterstop 34 of the guide channel 16. This is designed in such a way that movement of the tray 2 in the opposite direction is imposed, with the tray 2 remaining in the mounting device 1. After the end of the unexpectedly high acceleration, the tray can simply be moved back, i.e., pushed back or plugged back, into the end position again.

The disclosure provides a motor vehicle in which positioning of the tray in a stable location is made possible by simple means. Rattling or sliding back and forth in the motor vehicle is thus avoided. Moreover, the tray has a fixed and as it were invariable location within the motor vehicle, making it a particularly simple matter to find it and also grasp it since the assigned storage location can be provided at an advantageous location for the driver of the motor vehicle. In particular, it is possible to position the mounting device in the motor vehicle in such a way that the tray is arranged parallel to a longitudinal direction of the vehicle. This is particularly space-saving. For example, the mounting device could be arranged in a footwell of the vehicle, in particular in a front passenger footwell close to the center console or adjacent to the latter. In this case, the at least one guide element of the tray interacts with the counter-guide element of the mounting device in such a way that positioning with the same alignment is always obtained while, in addition, stable positioning is maintained even when unexpected accelerations involving high forces occur. Ribs, grooves, variations in thickness, sprung irregularities, guide surfaces and counter-surfaces can be combined to give a problem-solving system.

In an ideal configuration, the tray may be matched to the design of the steering wheel or of the steering wheel rim.

The tray preferably has different radii and also a lower section which extends in a straight line. In addition, the tray has the tray surface, which faces the driver when the tray is situated on the steering wheel or steering wheel rim situated in the tray support position. By use of the mounting side, which is opposite the tray surface, the tray rests on the steering wheel or steering wheel rim, wherein an edge protection rubber can be provided to protect the steering wheel or steering wheel rim. At least one guide element is arranged on the mounting side.

In particular, the at least one guide element is embodied as an annular raised guide portion, and is arranged in the region of the lower tray section that extends in a straight line. Of course, the raised guide portion can have any other suitable configuration that allows guidance on counter-surfaces. The raised guide portion can be embodied as a rib-type raised portion, in particular in the form of a ring, saving material and weight. An indicator arrow can be arranged above the raised guide portion concerned. In particular, the indicator arrow can specify a direction of movement, in particular a plug-in direction of the tray into the mounting device, for which reason the indicator arrow is arranged centrally above the raised guide portion, close to the latter, on the mounting side.

In a preferred embodiment, the tray has a flattened edge portion in the region of the section of rectilinear design, the flattened portion having, on both sides, a thickened edge portion, and, adjoining the latter, end pieces with thickened edge portions, and, opposite thereto, counter-surfaces of the thickened edge portions. At least the end pieces with a thickened edge portion can likewise interact as a guide element with the counter-guide element, leading to improved centering and additional positional stability of the tray when the latter is mounted on the mounting device. The counter-surfaces of the thickened edge portions and the thickened edge portions, in contrast, each interact with a different element of the mounting device, further details of which will be given below.

In one embodiment, the counter-guide element has a guide channel, which has a funnel-shaped opening, a channel section, which adjoins the opening and runs obliquely, and a bottom section, which adjoins said channel section, runs in a straight line, in particular perpendicularly, and ends at an inner end stop, wherein the guide channel is formed by inner guide walls, each having sections which run obliquely and perpendicularly, respectively.

In particular, the guide channel has two inner guide walls, which are arranged opposite one another and end at the inner end stop. When the mounting device is arranged parallel to the longitudinal direction of the motor vehicle, it is possible to refer to a first, front, inner guide wall and a second, rear, inner guide wall. Of course, the mounting device can be arranged in any orientation, that is to say also at an angle, with respect to the longitudinal direction of the motor vehicle. In particular, the front inner guide wall has three sections. In this arrangement, the front inner guide wall extends obliquely, by use of a first section, from an insertion opening of the mounting device, in the direction of a center line and of a bottom of the mounting device, and merges into an adjoining second section, which, while extending perpendicularly, merges into a third section of arched configuration, wherein the arched shape is arched outward relative to the center line of the mounting device. The rear inner guide wall likewise has three sections. A first section of the rear inner guide wall extends obliquely from the insertion opening in the direction of the center line and of the bottom of the mounting device and merges into a second section, which is embodied with a curvature oriented away from the center line. In one embodiment, the counter-guide element, i.e. the guide channel, has a nose-like counterstop, wherein, in particular, a transition from the first section of the rear inner guide wall to the second section thereof is extended beyond the center line of the mounting device and thus forms the nose-like counterstop, which can prevent unwanted movement of the tray out of the mounting device. The second section merges into an adjoining third section, which is designed to run perpendicularly and ends at the inner end stop. The first section of the front inner guide wall is made longer than the first section of the rear inner guide wall. Together with the first section of the rear inner guide wall, a first part of the first section of the front inner guide wall forms the funnel-shaped opening of the guide channel. Together with the second section of the rear inner guide wall, a second part of the first section of the front guide wall forms the obliquely extending channel section of the guide channel. Together with the third section of the rear guide channel, the second and the third section of the front inner guide wall form the bottom section of the guide channel.

In another embodiment, the counter-guide element has two outer guide walls with sections which run obliquely and perpendicularly. When the mounting device is arranged parallel to the longitudinal direction of the motor vehicle, it is possible to refer to a first, front, outer guide wall and a second, rear, outer guide wall. In particular, the first, front, outer guide wall can have four sections. A first section of the first, front, outer guide wall begins, in particular, at the first section of the first, front, guide wall and extends obliquely, in a manner oriented away from the insertion opening of the mounting device and the center line thereof, in the direction of the bottom of the mounting device. The first section merges into an adjoining second section, which extends perpendicularly, parallel to the center line, in the direction of the bottom of the mounting device. The second section merges into an adjoining third section, which has an arched shape in the direction of the center line and merges into a fourth section which, like the second section of the front outer guide wall, has a perpendicular profile. In particular, the second, rear, outer guide wall can likewise have four sections. A first section of the rear outer guide wall begins, in particular, at the first section of the rear front guide wall and extends obliquely from the insertion openings in a manner oriented away from the center line of the mounting device, in the direction of the bottom of the latter. The first section merges into an s-shaped second section, which is adjoined by a third section which, like the first section, extends obliquely from the insertion openings in a manner oriented away from the center line of the mounting device, in the direction of the bottom. The third section is made longer than the first section but both have the same orientation. The third section is adjoined by a fourth section, which is aligned perpendicularly, parallel to the center line.

The outer guide walls of the counter-guide element interact with the associated end pieces of the tray, which have thickened edge portions, thus ensuring that a centered orientation is maintained when the tray is inserted into the mounting device.

In another embodiment, the counter-guide element has end contact surfaces which have a curved profile. When the mounting device is arranged parallel to the longitudinal direction of the motor vehicle, it is possible to refer to a first, front, end contact surface and a second, rear, end contact surface. In particular, the end contact surfaces form a transition between the respective outer guide walls and a bottom element of the counter-guide element. In this case, it is possible, in particular, for the end contact surfaces to be of curved design, thus enabling a transition which is as far as possible notch-free from the outer guide walls to the bottom element of the counter-guide element. The bottom guide element has, in particular, a bottom web, which extends between the two end contact surfaces, horizontally with respect to the bottom of the mounting device. A thickened bottom portion is provided, in particular centrally on the bottom web, which thickened portion forms the inner end stop and to which the front inner guide wall and the rear inner guide wall are connected, in particular by use of their respective third sections.

In another embodiment, the mounting device has positioning guide elements. Part of the circumference of the tray can be accommodated in the positioning guide elements. This means that the positioning guide elements each partially surround only a part of the circumference of the tray. When the mounting device is arranged parallel to the longitudinal direction of the motor vehicle, it is possible to refer to a first, front, positioning guide element and a second, rear, positioning guide element. Both are, however, of identical design and are arranged as a mirror image in relation to the center line. In particular, each positioning guide element has a curved abutment web, which is matched to an outer curvature of the tray, and a retaining web, which is oriented in the direction of the counter-guide element and is arranged perpendicularly on the abutment web. The positioning guide elements are, in particular, each open in the direction of the counter-guide clement, thus forming as it were an open receiving channel. As a preferred option, each positioning guide element furthermore has an insertion opening, which is in each case surrounded by a lateral guide edge. When the mounting device is arranged parallel to the longitudinal direction of the motor vehicle, it is possible to refer to a first, front, lateral guide edge and a second, rear, lateral guide edge. In particular, the lateral guide edge is in each case embodied in such a way that the insertion opening widens in a cone-like manner in the region of the respective lateral guide edge, making it easier to push in or plug in the tray.

In another embodiment, the mounting device has hold-down elements of flexible design. When the mounting device is arranged parallel to the longitudinal direction of the motor vehicle, it is possible to refer to a first, front, hold-down element and a second, rear, hold-down element. In particular, the hold-down elements are arranged adjacent to the respective outer guide walls of the counter-guide element, at the level of the respective fourth section of said guide walls. In particular, the front hold-down element is arranged higher than the rear hold-down element in relation to the bottom of the mounting device. The respective hold-down element could also be referred to as a spring element. In particular, the respective hold-down element has a spring tongue with a curved back. From its fastening end, the hold-down element is initially rectilinear and then curved in the manner of a circular segment in the direction of its free end. In this case, the free end of the respective hold-down element rests against the counter-surface of the thickened edge portion due to spring force when the tray is mounted in the mounting device.

In one embodiment, the mounting device has a wall element on which are arranged the counter-guide element as a rib-type raised portion, the positioning guide elements with their lateral guide edges, and the hold-down elements. In particular, this enables the wall element to be secured at a suitable location in the interior of the motor vehicle. In particular, said elements of the mounting device are embodied and also matched to one another in such a way that the tray remains in the mounting device in a stable location and without rattling, even in unexpected situations of acceleration, but can be easily removed, and manual removal along the guide channel, past the nose-like counterstop and along the outer guide walls and counter to the spring force of the hold-down elements presents no problems.

The mounting device 1 advantageously holds non-linear objects with different curvatures in a stable location, aligns them and holds them in place in the event of unexpected accelerations, avoiding a situation where loose objects move in the cab and significantly increasing the functionality of the motor vehicle 100 for the driver.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A motor vehicle, comprising:
a steering wheel having a steering wheel rim;
a tray;
a mounting device for the tray for use on the steering wheel or the steering wheel rim arranged in a tray support position;
wherein the tray has at least one guide element on a mounting side arranged opposite a tray surface;
wherein the mounting device has a counter-guide element configured to receive the at least one guide element;
wherein the tray is configured to fit on the steering wheel or the steering wheel rim and has different radii and also a lower section which extends in a straight line; and
wherein the at least one guide element is embodied as an annular raised guide portion, and wherein an indicator arrow is arranged on the mounting side.

2. The motor vehicle of claim 1, wherein the mounting device has flexible hold-down elements, each of which has a spring tongue with a curved back, wherein, from a fastening end, the respective hold-down element is initially rectilinear and then curved in a circular segment in a direction of a free end.

3. The motor vehicle of claim 1, wherein the mounting device has a wall element.

4. A motor vehicle, comprising:
a steering wheel having a steering wheel rim;
a tray;
a mounting device for the tray for use on the steering wheel or the steering wheel rim arranged in a tray support position;
wherein the tray has at least one guide element on a mounting side arranged opposite a tray surface;
wherein the mounting device has a counter-guide element configured to receive the at least one guide element;
wherein the counter-guide element has a guide channel, which has a funnel-shaped opening, a channel section, which adjoins the funnel-shaped opening and runs obliquely, and a bottom section, which adjoins the channel section, runs in a straight line perpendicularly and ends at an inner end stop, and
wherein the guide channel is formed by inner guide walls, each having sections which run obliquely and perpendicularly, respectively.

5. The motor vehicle of claim 4, wherein the guide channel has a counterstop on one of the inner guide walls.

6. A motor vehicle, comprising:
a steering wheel having a steering wheel rim;

a tray;

a mounting device for the tray for use on the steering wheel or the steering wheel rim arranged in a tray support position;

wherein the tray has at least one guide element on a mounting side arranged opposite a tray surface;

wherein the mounting device has a counter-guide element configured to receive the at least one guide element; and wherein the counter-guide element has two outer guide walls with sections which run obliquely.

7. A motor vehicle, comprising:

a steering wheel having a steering wheel rim;

a tray;

a mounting device for the tray for use on the steering wheel or the steering wheel rim arranged in a tray support position;

wherein the tray has at least one guide element on a mounting side arranged opposite a tray surface;

wherein the mounting device has a counter-guide element configured to receive the at least one guide element; and wherein the mounting device has positioning guide elements, wherein each positioning guide element has a curved abutment web, which is matched to an outer curvature of the tray, and a retaining web, which is oriented in a direction of the counter-guide element and is arranged perpendicularly on the abutment web.

8. The motor vehicle of claim 7, wherein each positioning guide element furthermore has an insertion opening surrounded by a lateral guide edge, wherein the lateral guide edge widens the insertion opening in a cone-like manner.

9. A motor vehicle, comprising:

a steering wheel having a steering wheel rim;

a tray;

a mounting device for the tray for use on the steering wheel or the steering wheel rim arranged in a tray support position;

wherein the tray has at least one guide element on a mounting side arranged opposite a tray surface;

wherein the mounting device has a counter-guide element configured to receive the at least one guide element; and wherein the counter-guide element has end contact surfaces which have a curved profile.

10. A vehicle accessory comprising:

a tray designed for use on a steering wheel or steering wheel rim arranged in a tray support position on a motor vehicle, the tray comprising at least one guide element on a mounting side arranged opposite a tray surface;

a mounting device for holding the tray when the tray is not in use on the steering wheel or steering wheel rim, wherein the mounting device comprises a counter-guide element configured to receive the at least one guide element; and wherein the mounting device has flexible hold-down elements, each of which has a spring tongue with a curved back, wherein, from a fastening end, the respective hold-down element is initially rectilinear and then curved in a circular segment in a direction of a free end.

11. The vehicle accessory of claim 10, wherein the tray is matched to the steering wheel or of the steering wheel rim and has different radii and also a lower section which extends in a straight line, wherein the at least one guide element is embodied as an annular raised guide portion, and wherein an indicator arrow is arranged on the mounting side.

12. The vehicle accessory of claim 10, wherein the counter-guide element has a guide channel, which has a funnel-shaped opening, a channel section, which adjoins the funnel-shaped opening and runs obliquely, and a bottom section, which adjoins the channel section, runs in a straight line perpendicularly and ends at an inner end stop, wherein the guide channel is formed by inner guide walls, each having sections which run obliquely.

13. The vehicle accessory of claim 12, wherein the guide channel has a counterstop on one of the inner guide walls.

14. The vehicle accessory of claim 10, wherein the counter-guide element has two outer guide walls with sections which run obliquely.

15. The vehicle accessory of claim 10, wherein the counter-guide element has end contact surfaces which have a curved profile.

16. The vehicle accessory of claim 10, wherein the mounting device has positioning guide elements, wherein each positioning guide element has a curved abutment web, which is matched to an outer curvature of the tray, and a retaining web, which is oriented in a direction of the counter-guide element and is arranged on the abutment web.

17. The vehicle accessory of claim 16, wherein each positioning guide element furthermore has an insertion opening surrounded by a lateral guide edge, wherein the lateral guide edge widens the insertion opening in a cone-like manner.

18. The vehicle accessory of claim 10, wherein the mounting device has a wall element.

* * * * *